(12) United States Patent
Kim et al.

(10) Patent No.: US 10,664,418 B2
(45) Date of Patent: May 26, 2020

(54) PERIPHERAL DEVICE CONTROLLING DEVICE, OPERATION METHOD THEREOF, AND OPERATION METHOD OF PERIPHERAL DEVICE CONTROLLING DEVICE DRIVER

(71) Applicant: SEOUL NATIONAL UNIVERSITY R&DB FOUNDATION, Seoul (KR)

(72) Inventors: JangWoo Kim, Seoul (KR); JaeHyung Ahn, Yangsan-si (KR); DongUp Kwon, Suwon-si (KR)

(73) Assignee: Seoul National University R&DB Foundation, Seoul (KR)

( * ) Notice: Subject to any disclaimer, the term of this patent is extended or adjusted under 35 U.S.C. 154(b) by 0 days.

(21) Appl. No.: 16/127,362

(22) Filed: Sep. 11, 2018

(65) Prior Publication Data

US 2019/0095359 A1  Mar. 28, 2019

(30) Foreign Application Priority Data

Sep. 25, 2017  (KR) .......................... 10-2017-0123717

(51) Int. Cl.
*G06F 13/12* (2006.01)
*G06F 13/42* (2006.01)
(Continued)

(52) U.S. Cl.
CPC ............ *G06F 13/128* (2013.01); *G06F 12/10* (2013.01); *G06F 13/126* (2013.01); *G06F 13/4221* (2013.01); *G06F 15/17331* (2013.01)

(58) Field of Classification Search
CPC ...... G06F 13/128; G06F 12/10; G06F 13/126; G06F 13/4221; G06F 15/17331
(Continued)

(56) References Cited

U.S. PATENT DOCUMENTS 8,244,930 B1 * 8/2012 Dykema ................. G06F 13/28
                                                           710/22
9,459,798 B2  10/2016 He et al.
(Continued)

FOREIGN PATENT DOCUMENTS

JP    2011113163 A    6/2011
KR   20100107485 A   10/2010
(Continued)

OTHER PUBLICATIONS

Jaehyung Ahn et al. "DCS: A Fast and Scalable Device-Centric Server Architecture". 48th Annual IEEE/ACM International Symposium on Microarchitecture (MICRO). IEEE. Dec. 2015. p. 559-571.

(Continued)

*Primary Examiner* — Christopher B Shin
(74) *Attorney, Agent, or Firm* — Harness, Dickey & Pierce, P.L.C.

(57) ABSTRACT

A peripheral device controlling device according to an embodiment of the inventive concept includes a command queue for storing at least one Device to Device (D2D) command for data communication between a first peripheral device and a second peripheral device, a command parser for obtaining information related to the data communication from the at least one D2D command, and an orchestrator for controlling at least one of the first peripheral device and the second peripheral device to transfer data from the first peripheral device to the second peripheral device based on the acquired information.

19 Claims, 11 Drawing Sheets

(51) Int. Cl.
*G06F 15/17* (2006.01)
*G06F 12/10* (2016.01)
*G06F 15/173* (2006.01)
*G06F 13/00* (2006.01)

(58) Field of Classification Search
USPC .......................................................... 710/52
See application file for complete search history.

(56) References Cited

U.S. PATENT DOCUMENTS

| | | | |
|---|---|---|---|
| 9,558,148 B2 | 1/2017 | Magro et al. | |
| 2006/0256796 A1* | 11/2006 | Agarwala | G06F 13/28 370/395.7 |
| 2006/0259662 A1* | 11/2006 | Furukawa | G06F 3/0221 710/40 |
| 2009/0210581 A1 | 8/2009 | Flanagan et al. | |
| 2011/0034125 A1* | 2/2011 | Preston | H04M 1/6066 455/41.2 |
| 2011/0191554 A1* | 8/2011 | Sakai | G06F 3/0613 711/162 |
| 2012/0030402 A1 | 2/2012 | Murakami et al. | |
| 2012/0165062 A1* | 6/2012 | Preston | H04M 1/6066 455/518 |
| 2016/0328348 A1* | 11/2016 | Iba | G06F 9/5077 |
| 2017/0286337 A1* | 10/2017 | Wang | G06F 13/36 |
| 2018/0351741 A1* | 12/2018 | Kim | H04L 9/0891 |
| 2018/0351746 A1* | 12/2018 | Yoon | H04L 9/0891 |

FOREIGN PATENT DOCUMENTS

| | | |
|---|---|---|
| KR | 10-2011-0126690 A | 11/2011 |
| KR | 10-1670342 B1 | 10/2016 |
| KR | 10-1713405 B1 | 3/2017 |

OTHER PUBLICATIONS

Adrian M. Caulfield et al. "QuickSAN: A Storage Area Network for Fast, Distributed, Solid State Disks". ISCA '13 Tel-Aviv. 2013.
Sang-Woo Jun et al. "BlueDBM: An Appliance for Big Data Analytics". ISCA '15. Jun. 2015.
Dongup Kwon et al. "DCS-ctrl: A Fast and Flexible Device-Control Mechanism for Device-Centric Server Architecture". 2018 ACM/IEEE 45th Annual International Symposium on Computer Architecture (ISCA). IEEE. Jun. 2018.

* cited by examiner

FIG. 4

| | Target device or data processing termination(DD) | Communication Direction (CD) | Source Address (SA) | Destination Address (DA) | Data Length (DL) | Dependency (DI) | Others (EI) |
|---|---|---|---|---|---|---|---|
| CMD1 (Data transmission from SSD to GPU) | SSD | Read | LBA | Memory address of GPU | 4KB | Null | Null |
| CMD2 (Data transmission from SSD to NIC) | SSD | Read | LBA | memory address of intermediate buffer | 3KB | 1 | Null |
| CMD3 | NIC | Write | Memory address of intermediate buffer | Null | 3KB | 0 | TCP/IP Information |
| CMD4 (Process data of SSD and transmit it to NIC) | SSD | Read | LBA | First memory address of intermediate buffer (b1) | 4KB | 1 | Null |
| CMD5 | MD5 hash | Null | First memory address of intermediate buffer (b1) | Second memory address of intermediate buffer (b2) | 4KB | 2 | Null |
| CMD6 | NIC | Write | Second memory address of intermediate buffer (b2) | Null | 2KB | 0 | TCP/IP Information |

PERIPHERAL DEVICE CONTROLLING DEVICE, OPERATION METHOD THEREOF, AND OPERATION METHOD OF PERIPHERAL DEVICE CONTROLLING DEVICE DRIVER

CROSS-REFERENCE TO RELATED APPLICATIONS

This U.S. non-provisional patent application claims priority under 35 U.S.C. § 119 of Korean Patent Application No. 10-2017-0123717, filed on Sep. 25, 2017, the entire contents of which are hereby incorporated by reference.

BACKGROUND

The present disclosure herein relates to a peripheral device controlling device, an operation method thereof, and an operation method of a peripheral device controlling device driver, and more particularly, a peripheral device controlling device for supporting Device to Device between peripheral devices, an operation method thereof, and an operation method of a peripheral device controlling device driver.

One server system includes various types of peripheral devices, and may perform data storage, data communication, data processing, and the like through peripheral devices. For example, a server system may store data through a solid state drive (SSD) and transmit and receive data through a network interface card (NIC). A server system may accelerate data processing through a graphics processing unit (GPU).

A peripheral device may transmit data to another peripheral device based on a standard interface (e.g., Peripheral Component Interconnect Express (PCIe)). For data transfer between peripheral devices, the CPU or memory resources of a host may be used. When data communication is performed using the resources of the host, the time for data communication between the peripheral devices may increase, and the use of a CPU or memory resources may increase.

SUMMARY

The present disclosure is to provide a peripheral device controlling device capable of shortening the time for data communication between peripheral devices and minimizing the use of a host CPU or memory resource, an operation method thereof, and an operation method of a peripheral device controlling device driver.

An embodiment of the inventive concept provides a peripheral device controlling device including: a command queue configured to store at least one Device to Device (D2D) command for data communication between a first peripheral device and a second peripheral device; a command parser configured to obtain information related to the data communication from the at least one D2D command; and an orchestrator configured to control at least one of the first peripheral device and the second peripheral device such that data is transferred from the first peripheral device to the second peripheral device based on the obtained information.

In an embodiment, the at least one D2D command may include information on a target device, a source address, and a destination address associated with the data communication, the target device may indicate the first peripheral device or the second peripheral device, the source address may indicate a memory address of the first peripheral device, and the destination address may indicate a memory address of the second peripheral device.

In an embodiment, the orchestrator may control the target device to fetch data stored in the source address based on the at least one D2D command and control the target device to store the fetched data in the destination address.

In an embodiment, the at least one D2D command may further include information on a communication direction and a data length associated with the data communication, wherein the communication direction may indicate whether the data is written to the target device or read from the target device, and the data length indicates a length of data stored in the source address.

In an embodiment, the at least one D2D command may further include information on dependency associated with the data communication, wherein the dependency may indicate whether there is a dependent D2D command to be additionally performed after the at least one D2D command is performed, wherein the orchestrator may determine that the dependent D2D command does not exist based on the dependency.

The orchestrator may generate a peripheral device command corresponding to the at least one D2D command, and transmit the peripheral device command to the target device.

In an embodiment, the orchestrator may generate the peripheral device command in accordance with a standard device protocol requested by the target device.

In an embodiment, the peripheral device controlling device may further include, when data stored in the first peripheral device or the second peripheral device is fetched, an intermediate buffer for storing the fetched data.

In an embodiment, the at least one D2D command may include a first D2D command and a second D2D command, and the first D2D command and the second D2D command each may include information on a target device, a source address, a destination address, and a dependency related to the data communication, wherein the target device of the first D2D command may indicate the first peripheral device, the source address of the first D2D command may indicate a memory address of the first peripheral device, the destination address of the first D2D command may indicate a memory address of the intermediate buffer, and the dependency of the first D2D command may indicate that the dependent second D2D command exists, wherein the target device of the second D2D command may indicate the second peripheral device, the source address of the second D2D command may indicate the memory address of the intermediate buffer, the destination address of the second D2D command may indicate a memory address of the second peripheral device, and the dependency of the second D2D command may indicate that the dependent D2D command does not exist.

In an embodiment, the orchestrator may control the first peripheral device to fetch data stored in the memory address of the first peripheral device based on the first D2D command and to store the fetched data in the memory address of the intermediate buffer, and control the second peripheral device to fetch data stored in the memory address of the intermediate buffer based on the second D2D command and to store the fetched data in the memory address of the second peripheral device.

In an embodiment, the orchestrator may perform the first D2D command based on the dependency of the first D2D command and the dependency of the second D2D command and then perform the second D2D command.

In an embodiment, one of the first D2D command and the second D2D command may further include information of Transmission Control Protocol/Internet Protocol (TCP/IP), wherein the orchestrator may control the second peripheral device to fetch data stored in the memory address of the intermediate buffer based on the second D2D command, and control the second peripheral device to generate a packet including the fetched data and the TCP/IP information and to transmit the generated packet to the outside.

In an embodiment, the peripheral device controlling device may further include a near-device processor for processing data stored in the intermediate buffer and storing result data generated from the processing in the intermediate buffer.

In an embodiment, the at least one D2D command may include a first D2D command, a second D2D command, and a third D2D command, the first D2D command and the third D2D command each may include information on a target device, a source address, a destination address, and a dependency associated with the data communication, and the second D2D command may include information on a data processing type, a source address, a destination address, and a dependency related to the processing, wherein the target device of the first D2D command may indicate the first peripheral device, the source address of the first D2D command may indicate a memory address of the first peripheral device, the destination address of the first D2D command may indicate a first memory address of the intermediate buffer, and the dependency of the first D2D command indicates that a dependent second D2D command exists, wherein the data processing type of the second D2D command may indicate a kind of operation corresponding to the processing, the source address of the second D2D command may indicate the first memory address of the intermediate buffer, the destination address of the second D2D command may indicate a second memory address of the intermediate buffer, and the dependency of the second D2D command may indicate that a dependent third D2D command exists, wherein the target device of the third D2D command may indicate the second peripheral device, the source address of the third D2D command may indicate the second memory address of the intermediate buffer, the destination address of the third D2D command may indicate a memory address of the second peripheral device, and the dependency of the third D2D command may indicate that a dependent D2D command does not exist.

In an embodiment, the orchestrator may control the first peripheral device to fetch data stored in the memory address of the first peripheral device based on the first D2D command and control the first peripheral device to store the fetched data in the first memory address of the intermediate buffer, control the near-device processor to process data stored in the first memory address of the intermediate buffer according to the data processing type based on the second D2D command and then, control the near-device processor to store the result data in the second memory address of the intermediate buffer, and control the second peripheral device to fetch data stored in the second memory address of the intermediate buffer based on the third D2D command and control the second peripheral device to store the fetched data in the memory address of the second peripheral device.

In an embodiment, each of the first peripheral device, the second peripheral device, and the peripheral device controlling device may be mounted in a Peripheral Component Interconnect Express (PCIe) slot.

In an embodiment of the inventive concept, an operation method of a peripheral device controlling device for controlling at least one of a first peripheral device and a second peripheral device includes receiving at least one D2D command for transmission of data between the first peripheral device and the second peripheral device; obtaining information related to the transmission of the data from the at least one D2D command; generating at least one peripheral device command based on the obtained information; and transmitting the at least one peripheral device command to at least one of the first peripheral device and the second peripheral device.

In an embodiment, the method may further include: determining whether the at least one D2D command includes a data processing command based on the obtained information; and processing the data if the data processing command exists.

In an embodiment of the inventive concept, operation method of a peripheral device controlling device driver for transferring a command for data communication between a first peripheral device and a second peripheral device to a peripheral device controlling device from a host, the method including: receiving from the host the command for transferring data from the first peripheral device to the second peripheral device; checking driving information of the first peripheral device and the second peripheral device from the host; generating at least one D2D command for the command based on the driving information; and transferring the at least one D2D command to the peripheral device controlling device.

In an embodiment, the D2D command may include information on a target device, a source address, and a destination address associated with the data communication, the target device may indicate the first peripheral device or the second peripheral device, the source address may indicate a memory address of the first peripheral device, and the destination address may indicate a memory address of the second peripheral device.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings:

FIG. 4 shows an example of a D2D command according to an embodiment of the inventive concept;

DETAILED DESCRIPTION

In the following, embodiments of the inventive concept will be described in detail so that those skilled in the art easily carry out the inventive concept.

Figure 1:
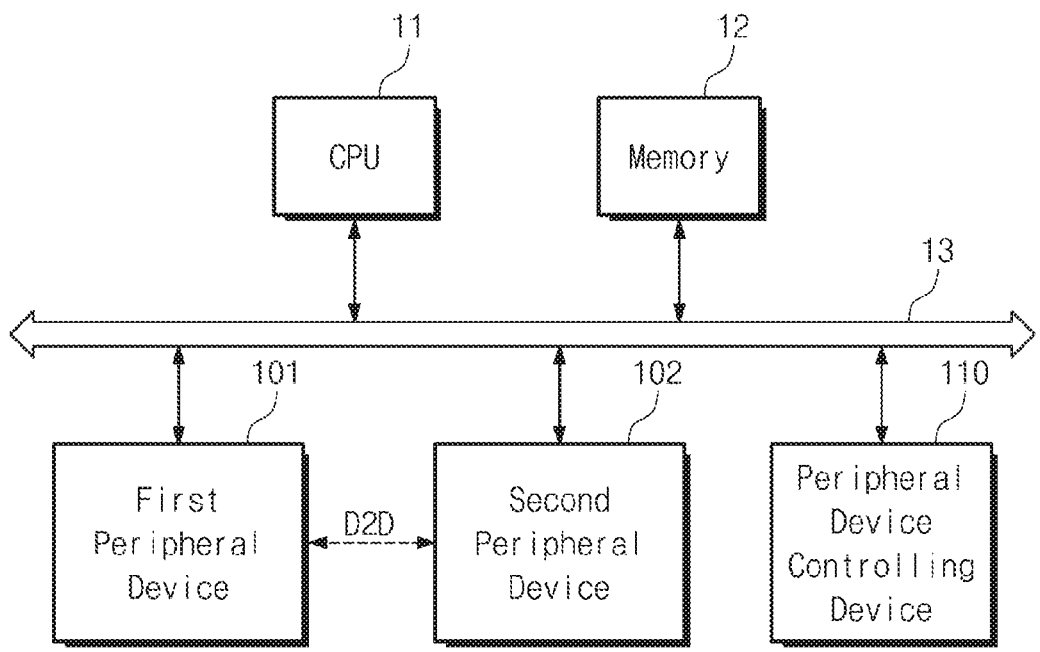
FIG. 1 is a block diagram illustrating a server system according to an embodiment of the inventive concept.

FIG. 1 is a block diagram illustrating a server system according to an embodiment of the inventive concept. Referring to FIG. 1, a server system 100 includes a peripheral device controlling device 110, a central processing unit (CPU) 11, a memory 12, an interface 13, a first peripheral device 101, and a second peripheral device 102.

The peripheral device controlling device 110 controls the first peripheral device 101 and/or the second peripheral device 102 so as to provide Device to Device (D2D) between the first and second peripheral devices 101 and 102.

D2D in the inventive concept means that when data communication is performed between the first and second peripheral devices 101 and 102, the first and second peripheral devices 101 and 102 perform data transmission/reception without using the resource of the CPU 11 or the memory 12. Accordingly, the first and second peripheral devices 101 and 102 may directly perform data communication without going through a host (for example, a CPU, a memory, and the like).

The peripheral device controlling device 110 may perform intermediate data processing. In the inventive concept, intermediate data processing means performing an arithmetic operation on data stored in the first and second peripheral devices 101 and 102. For example, the peripheral device controlling device 110 may perform intermediate data processing when data processing is required for data communication between the first and second peripheral devices 101 and 102. Accordingly, the data stored in either the first peripheral device 101 or the second peripheral device 102 may be changed to other data by the intermediate data processing. The changed data may be transferred to either the first peripheral device 101 or the second peripheral device 102.

For example, if D2D and intermediate data processing between the first peripheral device 101 and the second peripheral device 102 are required, the peripheral device controlling device 110 may control the first peripheral device 101 to receive the stored data from the first peripheral device 101. The peripheral device controlling device 110 may process the received data. The peripheral device controlling device 110 may control the second peripheral device 102 to transfer the processed result data to the second peripheral device 102.

The CPU 11 controls the operation of the server system 100 as a whole. For example, the CPU 11 may control the peripheral device controlling device 110 to cause the D2D between the first peripheral device 101 and the second peripheral device 102 to be performed. For example, through software (e.g., device driver) for the peripheral device controlling device 110, the CPU 11 may control the peripheral device controlling device 110 by transmitting a D2D command to the peripheral device controlling device 110. The peripheral device controlling device 110 may control the D2D between the first and second peripheral devices 101 and 102 in response to the D2D command.

The memory 12 may store data related to the operations performed by the CPU 11. For example, the memory 12 may include random access memory (RAM) or read only memory (ROM). The CPU 11 may use the memory 12 to operate the application. As the application is running, D2D or intermediate data processing between the first peripheral device 101 and the second peripheral device 102 may be required.

The interface 13 may support data communication between the peripheral device controlling device 110, the CPU 11, the memory 12, and the first and second peripheral devices 101 and 102. For example, the peripheral device controlling device 110 may transmit peripheral device commands to the first peripheral device 101 via the interface 13. The first peripheral device 101 receiving the peripheral device command may transmit the stored data to the second peripheral device 102 through the interface 13.

The interface 13 may be a standard interface (e.g., PCIe). The first peripheral device 101, the second peripheral device 102, and the peripheral device controlling device 110 may be connected to the interface 13 via I/O ports or slots of the interface 13.

The first and second peripheral devices 101 and 102 may transmit and receive data through the interface 13. The first and second peripheral devices 101 and 102 may perform various operations using the transmitted and received data. For example, each of the first and second peripheral devices 101 and 102 may be a storage device (e.g., SSD), a network device (e.g., an NIC) or an acceleration device (e.g., a GPU). The storage device may receive the data and store the received data. The network device may receive the data and transmit the received data to the outside of the server system 100. The acceleration device may receive data and perform operations on the received data.

The first peripheral device 101 or the second peripheral device 102 according to an embodiment of the inventive concept is not limited to the above-described examples, and may include various types of peripheral devices for transmitting and receiving data via the interface 13. Although only the first and second peripheral devices 101 and 102 are illustrated in FIG. 1, the inventive concept is not limited thereto, and the server system 100 may further include other peripheral devices.

According to the server system 100 of FIG. 1, D2D between the first peripheral device 101 and the second peripheral device 102 may be enabled. Thus, the CPU 11 or the memory 12 resources are not used, so that the data communication time may be shortened and the use of the CPU 11 or the memory 12 resources may be minimized.

Figure 2:
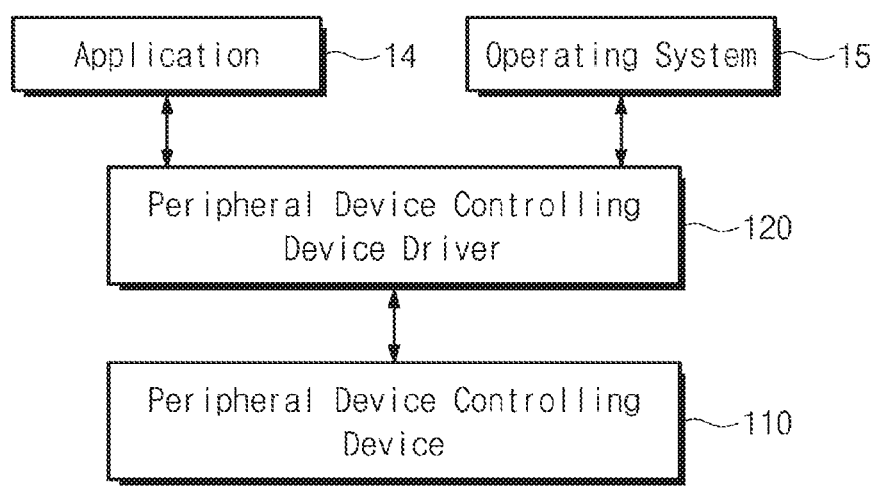
FIG. 2 is a block diagram illustrating an exemplary software layer including software operations of the server system of FIG. 1.

FIG. 2 is a block diagram illustrating an exemplary software layer including software operations of the server system of FIG. 1. Referring to FIGS. 1 and 2, the software layer of the server system 100 may include an application 14, an operating system 15, and a peripheral device controlling device driver 120.

The application 14 may include various application programs running on the server system 100. Depending on the execution of application 14, D2D and intermediate data processing between peripheral devices 101 and 102 may be required.

The operating system 15 may manage the resources of the CPU 11, the memory 12 and the peripheral devices 101 and 102 constituting the server system 100. For example, the operating system 15 may manage the data location (e.g., logical block address (LBA)) in the storage device. The operating system 15 may store network connection information (e.g., information of a socket such as a Transmission Control Protocol/Internet Protocol (TCP/IP) address).

The peripheral device controlling device driver 120 may be software used to control the peripheral device controlling device 110. When D2D or intermediate data processing is required, the peripheral device controlling device driver 120 may generate a D2D command and transfer the generated D2D command to the peripheral device controlling device 110. For example, the peripheral device controlling device driver 120 may generate and transmit D2D commands in accordance with the device protocol requested by the peripheral device controlling device 110. The peripheral device controlling device 110 may perform D2D or intermediate data processing based on the transmitted D2D command.

In an exemplary embodiment, the peripheral device controlling device driver 120 may provide functions for D2D and intermediate data processing. For example, the peripheral device controlling device driver 120 may provide a function that performs communication from the storage device to the network device, a function for performing communication from the network device to the storage device, and a function of performing data processing while performing communication from the storage device to the network device.

When D2D and intermediate data processing between the first and second peripheral devices 101 and 102 are required, the application 14 may call a function provided from the peripheral device controlling device driver 120. The application 14 may call the function and then pass the file descriptors of the first and second peripheral devices 101 and 102 to the peripheral device controlling device driver 120.

The peripheral device controlling device driver 120 may confirm information required for the D2D and the intermediate data processing commands between the first and second peripheral devices 101 and 102 via the operating system 15 based on the file descriptor received from the application 14. In an exemplary embodiment, the peripheral device controlling device driver 120 may verify the necessary information from the structure of the operating system 15.

The peripheral device controlling device driver 120 may collect necessary information from the operating system 15 to generate a D2D command, and may transmit the generated D2D command to the peripheral device controlling device 110. The D2D command may include information necessary to perform D2D and intermediate data processing. In an exemplary embodiment, the peripheral device controlling device driver 120 may generate at least one D2D command for D2D between the first and second peripheral devices 101 and 102. The peripheral device controlling device driver 120 transfers at least one or more D2D commands to the peripheral device controlling device 110 so that the peripheral device controlling device 110 performs an operation corresponding to each D2D command.

The peripheral device controlling device 110 may control the first and second peripheral devices 101 and 102 by confirming the transmitted D2D command. The peripheral device controlling device 110 may generate peripheral device commands for controlling the first and second peripheral devices 101 and 102 from the information contained in the D2D command. The first and second peripheral devices 101 and 102 may perform D2D in response to the peripheral device commands.

The peripheral device controlling device 110 may perform the intermediate data processing by confirming the transmitted D2D command. After processing the data stored in one of the first and second peripheral devices 101 and 102, the peripheral device controlling device 110 may transfer the processed result data to another one of the first and second peripheral devices 101 and 102. For example, the peripheral device controlling device 110 may perform an operation on data to be transferred before the data is transferred from the first peripheral device 101 to the second peripheral device 102. The peripheral device controlling device 110 may transmit the result data to the second peripheral device 102.

Figure 3:
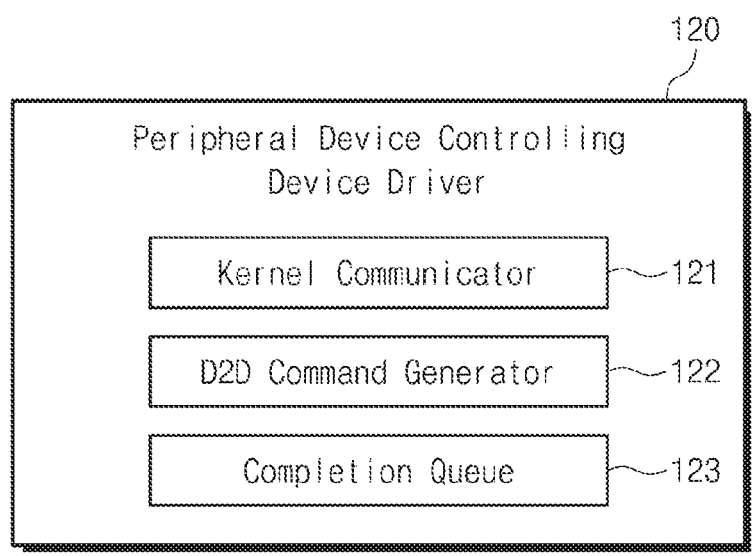
FIG. 3 is a block diagram of the peripheral device controlling device driver of FIG. 2.

FIG. 3 is a block diagram of the peripheral device controlling device driver of FIG. 2. Referring to FIGS. 1 to 3, the peripheral device controlling device driver 120 may include a kernel communicator 121, a D2D command generator 122, and a completion queue 123.

The kernel communicator 121 may confirm the peripheral device driving information required for D2D and the intermediate data processing command. In an exemplary embodiment, when a function for D2D and intermediate data processing is called by the application 14, the kernel communicator 121 may confirm the peripheral device driving information from the operating system 15. The peripheral device driving information may include information necessary for the peripheral device controlling device 110 to control the first and second peripheral devices 101 and 102 and information necessary for intermediate data processing. For example, the peripheral device driving information for controlling the first and second peripheral devices 101 and 102 may include information on a list of peripheral devices associated with D2D, the source address of data, a destination address, the length of data to be transmitted, a network socket, and the like. The peripheral device driving information for intermediate data processing may include the address of the data to be processed, the address where the processed result data is to be stored, the length of data to be processed, and the like.

The D2D command generator 122 may generate a D2D command based on the information collected by the kernel communicator 121. For example, the D2D command generator 122 may generate a D2D command according to a predetermined rule or an appointment between the peripheral device controlling device 110 and the peripheral device controlling device driver 120. The D2D command may include information for controlling the peripheral devices 101 and 102 and information for processing the intermediate data. The D2D command generator 122 may forward the generated D2D command to the peripheral device controlling device 110.

The completion queue 123 is a memory area for checking whether D2D and intermediate data processing are normally performed. The peripheral device controlling device 110 may confirm the delivered D2D command and perform an operation corresponding to the D2D command. The peripheral device controlling device 110 may perform D2D and intermediate data processing by performing an operation corresponding to the D2D command. After performing D2D and intermediate data processing, the peripheral device controlling device 110 may store in the completion queue 123 whether or not the D2D and intermediate data processing are normally performed. The peripheral device controlling device driver 120 may transfer to the application 14 via the completion queue 123 whether D2D and intermediate data processing are successfully performed.

FIG. 4 shows an example of a D2D command according to an embodiment of the inventive concept. Referring to FIG. 4, the D2D command includes a first data field DD indicating a target device or a data processing type, a second data field CD indicating a communication direction, a third data field SA indicating a source address, a fourth data field DA indicating destination address, a fifth data field DL indicating data length, a sixth data field DI indicating dependency, and a seventh data field EI indicating other information.

The first data field DD may include any one of information corresponding to the target device or information corresponding to the data processing type. The target device indicates a peripheral device in which an operation corresponding to the D2D command is to be performed among the first and second peripheral devices 101 and 102. For example, information corresponding to a target device may refer to a storage device (e.g., SSD), a network device (e.g., NIC), an acceleration device (e.g., GPU), and the like. When generating the D2D command for D2D, the D2D command generator 122 may include information corresponding to the target device in the D2D command.

The data processing type indicates an operation type to be processed by the peripheral device controlling device 110 when intermediate data processing is performed. For example, the information corresponding to the intermediate data processing may indicate "MD5 hash", "CRC32 checksum", and the like. When generating the D2D command for D2D, the D2D command generator 122 may include information corresponding to the data processing type in the D2D command.

The second data field CD may include information corresponding to the communication direction. The communication direction indicates whether the data is written to the target device or read from the target device. For example, when data in the target device is transmitted to another peripheral device, the communication direction may be "read". When data of another peripheral device is transmitted to the target device, the communication direction may be "write". In the case of the D2D command for intermediate data processing, the value corresponding to the communication direction may be "Null".

The third data field SA may include information corresponding to the source address. The source address represents the memory address of the first and second peripheral devices 101 and 102 or the peripheral device controlling device 110. In the case of D2D, the source address may be the memory address where the data to be transmitted is stored. In an exemplary embodiment, the source address may vary in type depending on the target device and communication direction.

For example, if the target device is a storage device and the communication direction is "read", then the source address may be the memory address of the storage device. When the storage device receives data from the acceleration device, the target device may be a storage device and the communication direction may be "write". In this case, the source address may be the memory address of the acceleration device. If the target device is an acceleration device and the communication direction is "read", the source address may be the memory address of the acceleration device.

Thus, the source address may be a value (e.g., "10000") corresponding to the memory address type of the storage device or a value (e.g., "0xab00000") corresponding to the memory address type of the acceleration device.

For intermediate data processing, the source address may be the memory address where the data to be processed is stored. For example, if the peripheral device controlling device 110 processes data stored in internal memory, the source address may be the address of an internal memory (e.g., an intermediate buffer).

The fourth data field DA may include information corresponding to the destination address. The destination address represents the memory address of the first and second peripheral devices 101 and 102 or the peripheral device controlling device 110. In the case of D2D, the destination address may be the memory address where the transmitted data is stored. In an exemplary embodiment, like the source address, the type of the destination address may be changed according to the target device and the communication direction.

For intermediate data processing, the destination address may represent the memory address where the processed result data is to be stored. For example, the destination address may be the address of the internal memory (e.g., an intermediate buffer) of the peripheral device controlling device 110.

The fifth data field DL may include information corresponding to the data length. In the case of D2D, the data length may be the length of the data to be transmitted. For example, the data length may be "4 KB". In the case of intermediate data processing, the data length may be the length of the data to be processed.

The sixth data field DI may include information corresponding to the dependency. The dependency indicates whether another D2D command (i.e., a dependent D2D command) associated with the D2D command is present. When there is a D2D command and a dependent D2D command, the dependent D2D command may be executed after the D2D command is executed. In an exemplary embodiment, if there is no dependent D2D command, the D2D command may not contain a value corresponding to the dependency (e.g., the value corresponding to the dependency is "Null"). If there is a dependent D2D command, the D2D commands may contain a value corresponding to the dependency (e.g., a value other than "Null").

When a plurality of D2D commands for D2D and intermediate data processing are generated, the order of the D2D commands to be performed may be determined from the value corresponding to the dependency. For example, if the value corresponding to the dependency is "1", the D2D command may be performed first among the associated D2D commands, and there may be a dependent D2D command. If the value corresponding to the dependency is "2", the D2D command may be performed second among the associated D2D commands, and there may be a dependent D2D command. If the value corresponding to the dependency is "0", the D2D command may be performed last among the associated D2D commands, and there may be no dependent D2D command.

The method of representing the value corresponding to the dependency according to an embodiment of the inventive concept is not limited to the above example, but may be implemented in a variety of ways without departing from the spirit of the inventive concept. For example, the D2D command may include a pointer value indicating a dependent D2D command as a value corresponding to the dependency.

The seventh data field EI may include information corresponding to other information. Other information indicates other data required for D2D and intermediate data processing operations. In an exemplary embodiment, other information may include information of TCP/IP. When the network device receives data by D2D, the network device may need information of TCP/IP to transmit the received data to the outside of the server system 100. If the TCP/IP information is included in the other information, the network device may generate a header of a packet to be transmitted to the outside using the TCP/IP information. In the case of the D2D command for intermediate data processing, the value corresponding to the other information may be "Null".

As shown in FIG. 4, the first D2D command CMD1 shows an example of the generated D2D command when data is transferred from the SSD to the GPU. The first D2D command CMD1 may include "SSD", "read", "LBA", "memory address of GPU", "4 KB", and "Null" value as values corresponding to the target device, communication direction, source address, destination address, data length, dependency, and other information, respectively. The first D2D command CMD1 indicates an operation in which the SSD fetches data of "4 KB" from its memory address and stores the fetched data in the memory address of the GPU.

The peripheral device controlling device 110 may receive the first D2D command CMD1 from the peripheral device controlling device driver 120. The peripheral device controlling device 110 may control the SSD based on the first D2D command CMD1. Accordingly, the SSD may fetch data of "4 KB" stored in the internal memory address and store the fetched data in the memory address of the GPU.

The second D2D command CMD2 and the third D2D command CMD3 show examples of D2D commands that are generated when data is transferred from the SSD to the NIC. When D2D is performed from the SSD to the NIC, the D2D command generator 122 may generate two D2D commands. Generally, since the memory of the network device does not freely access from the external device, the SSD may not access the memory of the NIC and directly store the fetched data. Accordingly, the SSD stores the fetched data in a memory (for example, an intermediate buffer) of the peripheral device controlling device 110, and the NIC fetches the data stored in the memory (e.g., an intermediate buffer) of the peripheral device controlling device 110, so that D2D from the SSD to the NIC may be performed. That is, the D2D command generator 122 may generate the second D2D command CMD2 for the SSD and the third D2D command CMD3 for the NIC, respectively.

The second D2D command CMD2 may include "SSD", "read", "LBA", "memory address of intermediate buffer, "3 KB", "1", and "Null" as values corresponding to the target device, communication direction, source address, destination address, data length, dependency, and other information, respectively. The second D2D command CMD2 indicates an operation in which the SSD fetches data of "3 KB" from its memory address and stores the fetched data in the memory address of the intermediate buffer. In addition, the second D2D command CMD2 indicates that a dependent D2D command exists.

The third D2D command CMD3 may include "NIC", "write", "memory address of intermediate buffer", "Null", "3 KB", "0", and "TCP/IP information" as values corresponding to the target device, communication direction, source address, destination address, data length, dependency, and other information, respectively. The third D2D command CMD3 indicates an operation in which the NIC fetches data of "3 KB" from the memory address of the intermediate buffer, generates a packet from the fetched data and TCP/IP information, and transmits the packet to the outside of the server system 100. Also, the third D2D command CMD3 indicates that there is no dependent D2D command.

The peripheral device controlling device 110 may receive the second D2D command CMD2 and the third D2D command CMD3 from the peripheral device controlling device driver 120. The peripheral device controlling device 110 may control the SSD based on the second D2D command CMD2. Accordingly, the SSD may fetch data of "3 KB" stored in the internal memory address and store the fetched data in the memory address of the intermediate buffer. The peripheral device controlling device 110 may control the NIC based on the third D2D command CMD3. Accordingly, the NIC may fetch data of "3 KB" stored in the memory address of the intermediate buffer, generate packets according to the TCP/IP information, and then transmit the fetched data to the outside of the server system 100.

Since the value corresponding to the dependency of the second D2D command CMD2 is "1", the peripheral device controlling device 110 may confirm that the third D2D command CMD3 associated with the second D2D command CMD2 exists. Accordingly, the peripheral device controlling device 110 may perform the third D2D command CMD3 after first performing the second D2D command CMD2.

The fourth to sixth D2D commands CMD4 to CMD6 represent examples of D2D commands when performing intermediate data processing during data transmission from the SSD to the NIC. When D2D and intermediate data processing are performed, the D2D command generator 122 may generate three D2D commands.

The fourth D2D command CMD4 may include "SSD", "read", "LBA", "first memory address b1 of intermediate buffer, "4 KB", "1", and "Null" as values corresponding to the target device, communication direction, source address, destination address, data length, dependency, and other information, respectively. The fourth D2D command CMD4 indicates an operation in which the SSD fetches data of "4 KB" from its memory address and stores the fetched data in the first memory address b1 of the intermediate buffer. Also, the fourth D2D command CMD4 is performed first among the fourth to sixth D2D commands CMD4 to CMD6 and indicates that a dependent D2D command exists.

The fifth D2D command CMD5 may include "MD5 hash", "Null", "first memory address b1 of intermediate buffer", "second memory address b2 of intermediate buffer", "4 KB", "2", and "Null" as values corresponding to the data processing type, communication direction, source address, destination address, data length, dependency, and other information, respectively. The fifth D2D command CMD5 indicates an operation in which the peripheral device controlling device 110 fetches the data of "4 KB" from the first memory address b1 of the intermediate buffer and performs the "MD5 hash" operation, and then stores an operation result in the second memory address b2 of the intermediate buffer. Also, the fifth D2D command CMD5 is performed second among the fourth to sixth D2D commands CMD4 to CMD6 and indicates that a dependent D2D command exists.

The sixth D2D command CMD6 may include "MC", "write", "second memory address b2 of intermediate buffer", "Null", "2 KB", "0", and "TCP/IP information" as values corresponding to the target device, communication direction, source address, destination address, data length, dependency, and other information, respectively. The sixth D2D command CMD6 indicates an operation in which the NIC fetches data of "2 KB" from the second memory address b2 of the intermediate buffer, generates a packet from the fetched data and TCP/IP information, and transmits the packet to the outside of the server system 100. Here, the data of "2 KB" may be the result data generated by the arithmetic operation according to the fifth D2D command CMD5. Also, the sixth D2D command CMD6 is performed last among the fourth to sixth D2D commands CMD4 to CMD6 and indicates that no dependent D2D command exists.

The peripheral device controlling device 110 may receive the fourth to sixth D2D commands CMD4 to CMD6 from the peripheral device controlling device driver 120. The peripheral device controlling device 110 may control the SSD based on the fourth D2D command CMD4. Accordingly, the SSD may fetch data of "4 KB" stored in the internal memory address and store the fetched data in the first memory address b1 of the intermediate buffer. The peripheral device controlling device 110 may perform an "MD5 hash" operation on the data stored in the first memory address b1 of the intermediate buffer based on the fifth D2D command CMD5. The peripheral device controlling device 110 may store the processed result data in the second memory address b2 of the intermediate buffer. The peripheral device controlling device 110 may control the NIC based on the sixth D2D command CMD6. Accordingly, the NIC may fetch data of "2 KB" stored in the second memory address b2 of the intermediate buffer, generate packets according to the TCP/IP information, and then transmit the generated packets to the outside of the server system 100.

The peripheral device controlling device 110 may determine the execution order based on the dependencies of the fourth to sixth D2D commands CMD4 to CMD6. Since the values corresponding to the dependencies of the fourth D2D command CMD4 and the fifth D2D command CMD5 are "1" and "2", respectively, the peripheral device controlling device 110 may perform the fourth D2D command CMD4 first and the fifth D2D command CMD5 second. In addition, since the value corresponding to the dependency of the sixth D2D command CMD6 is "0", the peripheral device controlling device 110 may finally perform the sixth D2D command CMD6.

As described above, the peripheral device controlling device driver 120 according to an embodiment of the inventive concept may generate a D2D command according to a predetermined rule or format and then, transfer it to the peripheral device controlling device 110. The D2D command according to an embodiment of the inventive concept is not limited to that shown in FIG. 4, and may be generated in various ways without departing from the spirit of the inventive concept. For example, the D2D command may be generated in a form including only some of the information shown in FIG. 4.

Figure 5:
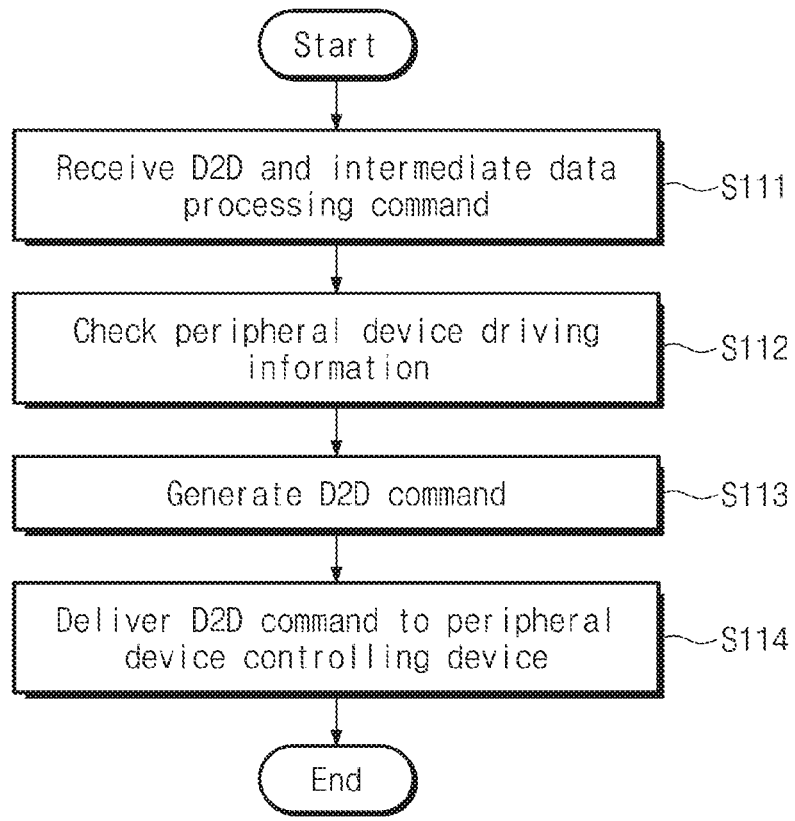
FIG. 5 is a flowchart illustrating an operation of the peripheral device controlling device driver of FIG. 3.

FIG. 5 is a flowchart illustrating an operation of the peripheral device controlling device driver of FIG. 3. Referring to FIGS. 1 to 3 and 5, in operation S111, the peripheral device controlling device driver 120 may receive the D2D and the intermediate data processing commands. In an exemplary embodiment, when the application 14 calls D2D and intermediate data processing functions, the peripheral device controlling device driver 120 may receive D2D and intermediate data processing commands.

The peripheral device controlling device driver 120 may receive the file descriptors of the first and second peripheral devices 101 and 102 associated with the D2D from the application 14. For example, if the storage device is associated with a D2D, the peripheral device controlling device driver 120 may receive from the application 14 a file descriptor of a file (for example, data to be transferred to the D2D) stored in the storage device. If the network device is associated with a D2D, the peripheral device controlling device driver 120 may receive the file descriptor of the socket connected to the network device from the application 14.

In operation S112, the peripheral device controlling device driver 120 may check the peripheral device driving information of the first and second peripheral devices 101 and 102 associated with the D2D. In an exemplary embodiment, the peripheral device controlling device driver 120 may verify the peripheral device driving information stored in the operating system 15 based on the received file descriptor. For example, the peripheral device controlling device driver 120 may check the file information (e.g., memory address, data size, etc.) of the storage device from the structure stored in the operating system 15. The peripheral device controlling device driver 120 may confirm socket information (e.g., TCP/IP address, etc.) of the network device from the structure stored in the operating system 15.

In operation S113, the peripheral device controlling device driver 120 may generate the D2D command based on the peripheral device driving information. In an exemplary embodiment, the D2D command may include a target device or data processing type, a communication direction, a source address, a destination address, a data length, a dependency, and other information.

The peripheral device controlling device driver 120 may generate a plurality of D2D commands according to the peripheral device associated with the D2D. In an exemplary embodiment, if a peripheral device that is not memory accessible is associated with the D2D, the peripheral device controlling device driver 120 may generate a plurality of D2D commands, as explained in FIG. 4.

In operation S114, the peripheral device controlling device driver 120 may transmit the generated D2D command to the peripheral device controlling device 110. In an exemplary embodiment, the peripheral device controlling device driver 120 may forward the generated D2D command to the command queue of the peripheral device controlling device 110. The peripheral device controlling device 110 may confirm the D2D command stored in the command queue and control the first and second peripheral devices 101 and 102 according to the D2D command.

Figure 6:
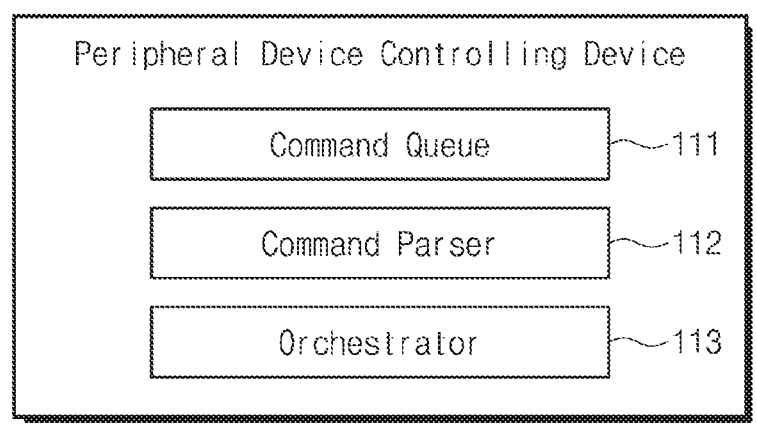
FIG. 6 is a block diagram illustrating one embodiment of the peripheral device controlling device of FIG. 1.

FIG. 6 is a block diagram illustrating one embodiment of the peripheral device controlling device of FIG. 1. Referring to FIGS. 1, 2, and 6, the peripheral device controlling device 110 includes a command queue 111, a command parser 112, and an orchestrator 113.

The command queue 111 may be a memory area for receiving and storing D2D commands. In an exemplary embodiment, the peripheral device controlling device driver 120 may generate the D2D command and then store the generated D2D command in the command queue 111. When there are a plurality of D2D commands, the peripheral device controlling device driver 120 may store the D2D command in the command queue 111 based on the order of execution. Alternatively, the peripheral device controlling device driver 120 may store the D2D command in the command queue 111 regardless of the execution order. Even if a plurality of D2D commands are stored in the command queue 111 irrespective of the order of execution, the peripheral device controlling device 110 may sequentially execute a plurality of D2D commands by checking values corresponding to the dependencies included in the D2D commands.

The command parser 112 may interpret the D2D command to confirm the information necessary to execute the D2D and the intermediate data processing command. In an exemplary embodiment, the command parser 112 may check a list of the first and second peripheral devices 101 and 102 for D2D, a memory address of data to be transferred, a memory address for storing transferred data, a data length to be transferred, dependency, and the like. The command parser 112 may check the data processing type for intermediate data processing, the memory address of the data to be processed, the memory address for storing the processed data, the data length to be processed, dependency, and the like. The command parser 112 may transmit the interpreted information to the orchestrator 113.

The orchestrator 113 may generate a peripheral device command using the received information. The peripheral device command may be a command for controlling the first and second peripheral devices 101 and 102. In an exemplary embodiment, the orchestrator 113 may generate peripheral device commands in accordance with standard device protocols required by the first and second peripheral devices 101 and 102 associated with D2D. For example, if the peripheral device associated with the D2D is a PCIe based storage device, the storage device may operate based on a Non-Volatile Memory Express (NVMe) standard interface. Thus, the orchestrator 113 may generate peripheral device commands in accordance with the NVMe standard device protocol.

The orchestrator 113 may control the peripheral device by transmitting the generated peripheral device command to the corresponding peripheral device. The first and second peripheral devices 101 and 102 may perform corresponding operations in response to peripheral device commands. The first and second peripheral devices 101 and 102 may perform an operation according to the peripheral device command and then transmit to the peripheral device controlling device 110 whether the operation is normally performed. In an exemplary embodiment, the first and second peripheral devices 101 and 102 may store information on the performance of operations in a queue (not shown) within the orchestrator 113. The orchestrator 113 may check whether or not the peripheral device normally operates from the data stored in the internal queue.

The orchestrator 113 may generate the peripheral device command based on the dependency information. In an exemplary embodiment, the orchestrator 113 may generate a peripheral device command to be performed first from the value corresponding to the dependency, and may transmit the generated command to the corresponding peripheral device. After confirming that the operation according to the peripheral device command is normally performed from the peripheral device, the orchestrator 113 may generate a peripheral device command to be executed second.

Thus, the orchestrator 113 may sequentially control the first and second peripheral devices 101 and 102 by sequentially generating peripheral device commands based on the dependency information. When the first and second peripheral devices 101 and 102 perform corresponding operations in response to peripheral device commands, the D2D and intermediate data processing operations requested by the application 14 may be completed.

Figure 7:
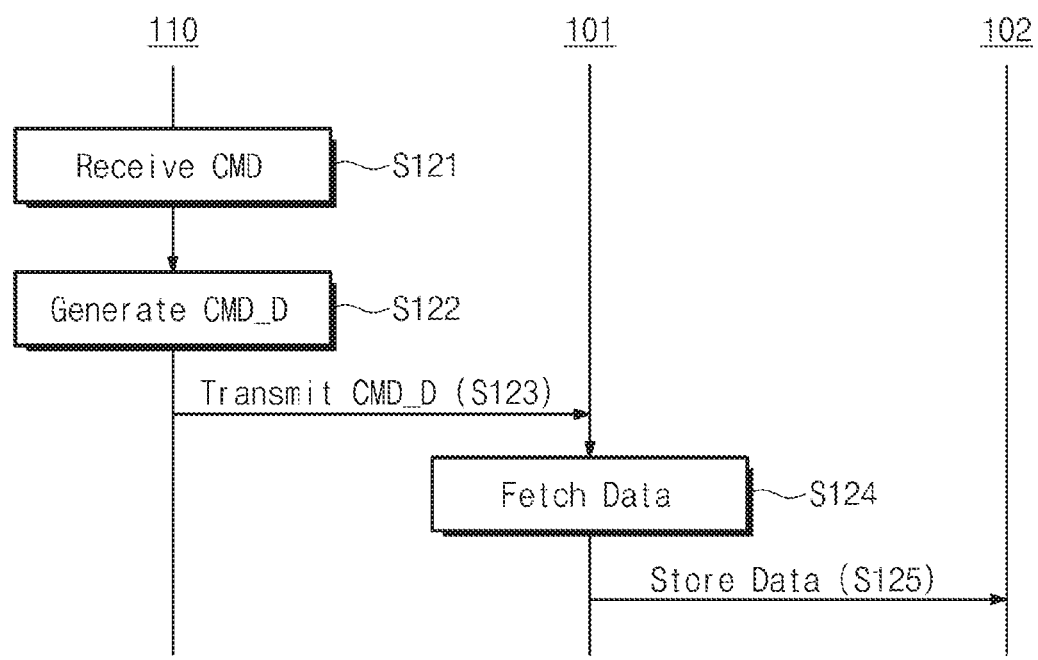
FIG. 7 is a flowchart showing one example of the operation of the peripheral device controlling device of FIG. 6.

FIG. 7 is a flowchart showing one example of the operation of the peripheral device controlling device of FIG. 6. FIG. 7 shows an example of D2D between the first and second peripheral devices 101 and 102. Hereinafter, for ease of explanation, it is assumed that the first peripheral device 101 is a storage device and the second peripheral device 102 is an acceleration device.

Referring to FIGS. 1, 2, 6 and 7, in operation S121, the peripheral device controlling device 110 may receive a D2D command CMD. In an exemplary embodiment, the peripheral device controlling device 110 may receive the D2D command CMD from the peripheral device controlling device driver 120. The peripheral device controlling device 110 may analyze the D2D command CMD and confirm the information necessary for the D2D. For example, the peripheral device controlling device 110 may receive the first D2D command CMD1 of FIG. 4. The peripheral device controlling device 110 interprets the first D2D command CMD1 in FIG. 4 to check information on the target device, communication direction, source address, destination address, data length, dependency, and the like.

In operation S122, the peripheral device controlling device 110 may generate the peripheral device command CMD_D based on the confirmed information. For example, the peripheral device controlling device 110 may generate a peripheral device command CMD_D for the storage device. When the storage device operates based on the NVMe standard interface, the peripheral device controlling device 110 may generate the peripheral device command CMD_D according to the NVMe standard device protocol.

In operation S123, the peripheral device controlling device 110 may transmit the generated peripheral device command CMD_D to the storage device. In operation S124, the storage device may fetch data stored in the memory in response to the peripheral device command CMD_D. In an exemplary embodiment, the storage device may fetch data from a memory address corresponding to the source address of the D2D command CMD. In operation S125, the storage device may store the fetched data in the acceleration device. In an exemplary embodiment, the storage device may store the fetched data in a memory address corresponding to the destination address of the D2D command CMD.

When operations S121 to S125 are performed, data stored in the storage device may be transmitted to the acceleration device. Therefore, D2D between the first and second peripheral devices 101 and 102 may be performed according to the operation of the peripheral device controlling device 110.

Figure 8:
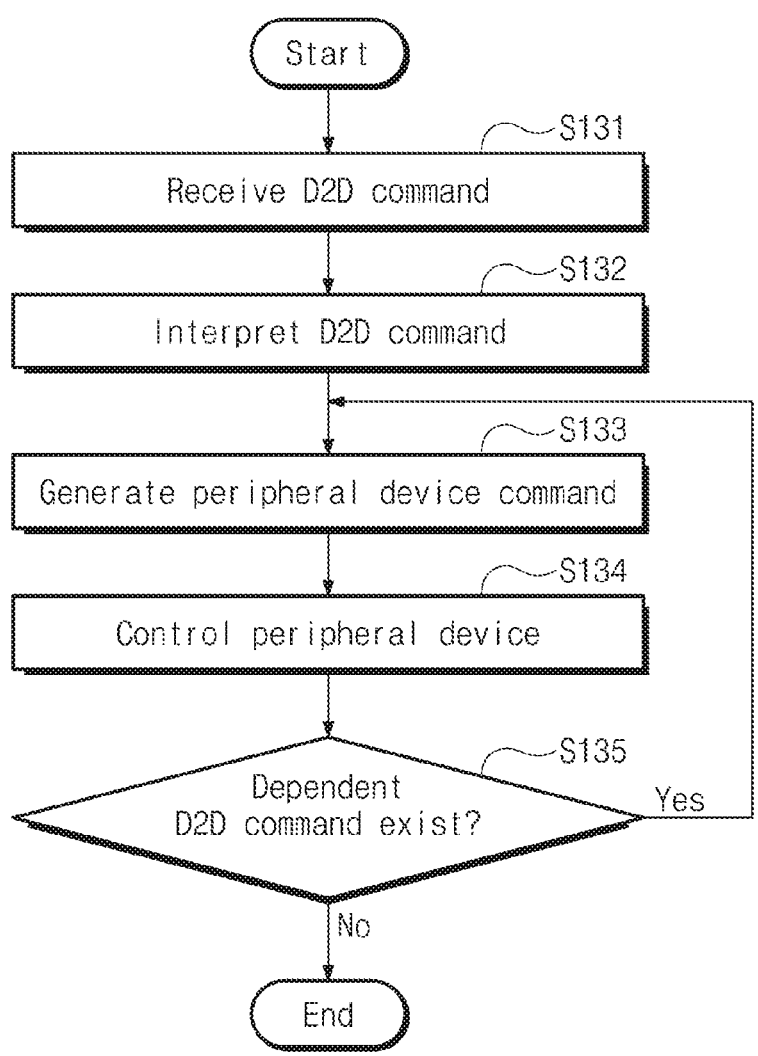
FIG. 8 is a flowchart showing an operation of the peripheral device controlling device of FIG. 6.

FIG. 8 is a flowchart showing an operation of the peripheral device controlling device of FIG. 6. Referring to FIGS. 1, 2, 6, and 8, in operation S131, the peripheral device controlling device 110 may receive the D2D command. In an exemplary embodiment, the peripheral device controlling device 110 may receive the D2D command from the peripheral device controlling device driver 120. In operation S132, the peripheral device controlling device 110 may interpret the received D2D command. The peripheral device controlling device 110 may analyze the D2D command and confirm the information required for the D2D between the first and second peripheral devices 101 and 102. In an exemplary embodiment, if there are a plurality of D2D commands, the peripheral device controlling device 110 may interpret the plurality of D2D commands to confirm the dependencies between the D2D commands.

In operation S133, the peripheral device controlling device 110 may generate a peripheral device command corresponding to the D2D command. In an exemplary embodiment, if there are a plurality of D2D commands, the peripheral device controlling device 110 may generate a peripheral device command corresponding to the D2D command to be performed first based on the dependency.

In operation S134, the peripheral device controlling device 110 may control the peripheral device by transmitting the generated peripheral device command to the peripheral device. In an exemplary embodiment, the peripheral device command may include a source address and a destination address of the corresponding D2D command. The peripheral device receiving the peripheral device command may fetch data from the source address and store the fetched data in the destination address. In this case, the source address and the destination address may be the memory addresses of different peripheral devices.

In operation S135, the peripheral device controlling device 110 may determine whether or not a separate dependent D2D command exists. In an exemplary embodiment, the peripheral device controlling device 110 may determine whether a dependent D2D command is present based on a value corresponding to the dependency. If there is a dependent D2D command, the peripheral device controlling device 110 may generate a peripheral device command corresponding to the dependent D2D command. For example, when a plurality of D2D commands are generated in D2D, there may be a dependent D2D command. If there is no dependent D2D command, the peripheral device controlling device 110 may terminate the operation.

If all the D2D commands received from the peripheral device controlling device driver 120 are processed, the peripheral device controlling device 110 may transmit to the peripheral device controlling device driver 120 whether D2D is normally performed.

The method of operating the peripheral device controlling device 110 according to an embodiment of the inventive concept is not limited to that shown in FIG. 8. In an exemplary embodiment, if there are a plurality of D2D commands, the peripheral device controlling device 110 may interpret only one of the plurality of D2D commands in operation S132. In this case, in operation S135, if there is a dependent D2D command, the peripheral device controlling device 110 may perform the operation in operation S132 again. After analyzing the dependent D2D command, the peripheral device controlling device 110 may generate the corresponding peripheral device command in operation S133.

Figure 9:
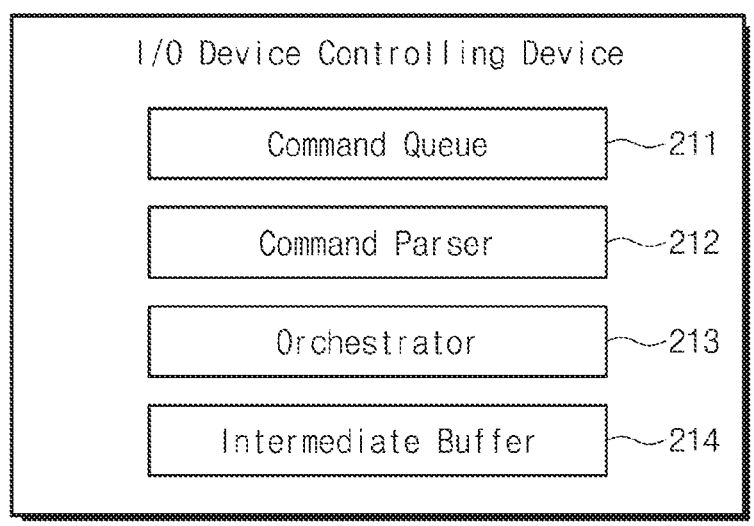
FIG. 9 is a block diagram illustrating one embodiment of the peripheral device controlling device of FIG. 1.

FIG. 9 is a block diagram illustrating one embodiment of the peripheral device controlling device of FIG. 1. Referring to FIG. 9, the peripheral device controlling device 210 may include a command queue 211, a command parser 212, an orchestrator 213, and an intermediate buffer 214. The command queue 211, the command parser 212 and the orchestrator 213 are similar to the command queue 111, the command parser 112 and the orchestrator 113 in FIG. 6, so that detailed description thereof will be omitted.

The intermediate buffer 214 may be a memory area used when the memory access of the peripheral device is impossible. In an exemplary embodiment, if the memory access of the peripheral device receiving the data is not possible, the peripheral device that transmits the data may fetch the data and store the fetched data in the intermediate buffer 214. The peripheral device receiving the data may fetch the data stored in the intermediate buffer 214 and store the fetched data in its memory.

Figure 10:
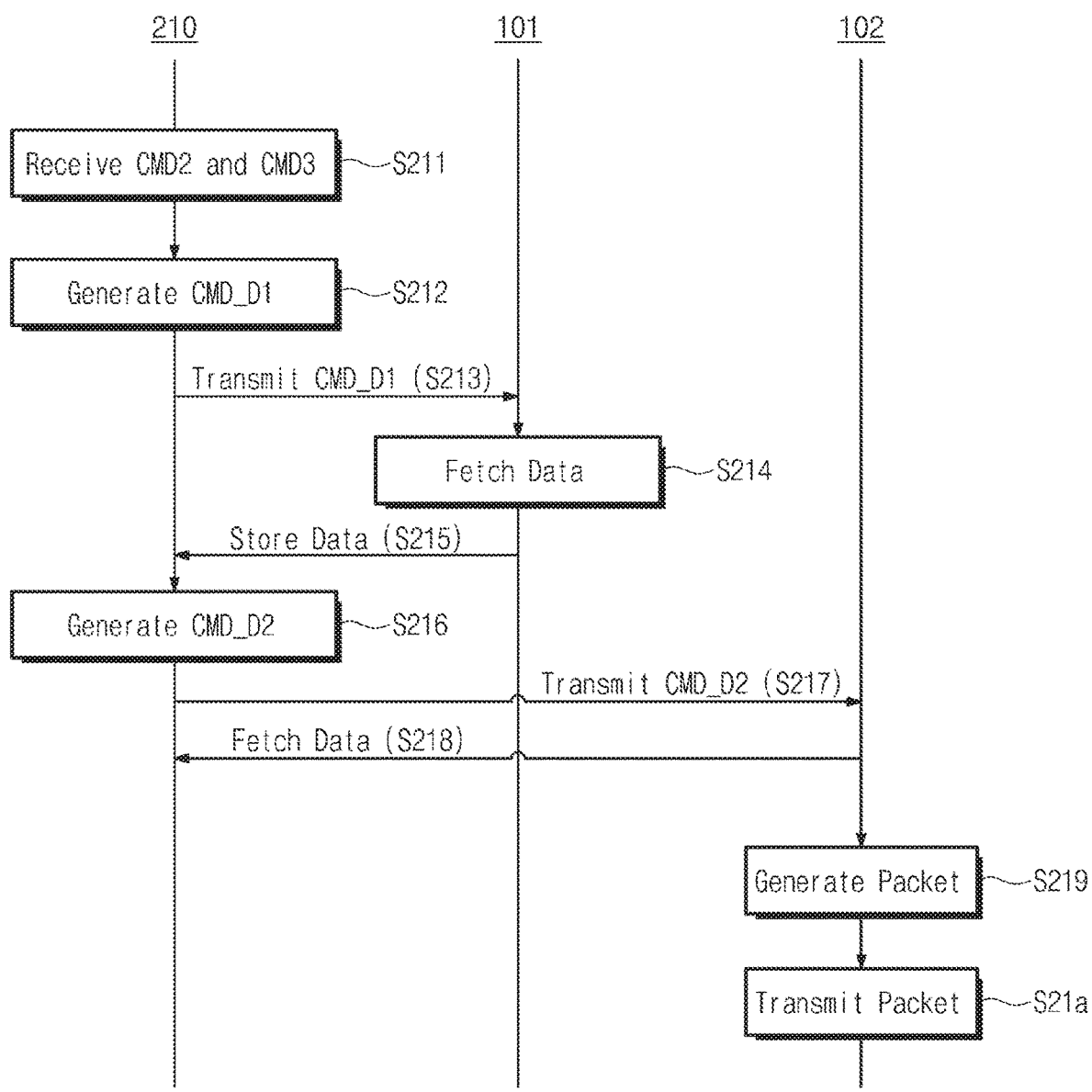
FIG. 10 is a flowchart showing one example of the operation of the peripheral device controlling device of FIG. 9.

FIG. 10 is a flowchart showing one example of the operation of the peripheral device controlling device of FIG. 9. FIG. 10 shows an example in which D2D is performed when there is a peripheral device that may not access memory among the first and second peripheral devices 101 and 102. Hereinafter, for ease of explanation, it is assumed that the first peripheral device 101 is a storage device and the second peripheral device 102 is a network device.

Referring to FIGS. 1, 2, 9 and 10, in operation S211, the peripheral device controlling device 210 may receive a second D2D command CMD2 and a third D2D command CMD3. The second D2D command CMD2 and the third D2D command CMD3 may be transmitted from the peripheral device controlling device driver 120. The target device of the second D2D command CMD2 may be a storage device, and the target device of the third D2D command CMD3 may be a network device. For example, the second D2D command CMD2 and the third D2D command CMD3 may be the second D2D command CMD2 and the third D2D command CMD3 shown in FIG. 4. The peripheral device controlling device 210 may obtain the information necessary for interpreting the second D2D command CMD2 and the third D2D command CMD3 to generate the peripheral device command.

In operation S212, the peripheral device controlling device 210 may generate the first peripheral device command CMD_D1. The peripheral device controlling device 210 may first generate the first peripheral device command CMD_D1 based on the value corresponding to the dependency. The first peripheral device command CMD_D1 may be a command that causes the storage device to fetch data stored in the memory and store the fetched data in the intermediate buffer 214. The peripheral device controlling device 210 may generate the first peripheral device command CMD_D1 according to the standard protocol required by the storage device.

In operation S213, the peripheral device controlling device 210 may transmit the generated first peripheral device command CMD_D1 to the storage device. In operation S214, the storage device may fetch data stored in the memory. In an exemplary embodiment, the storage device may fetch data from the source address of the first D2D command CMD1. In operation S215, the storage device may store the fetched data in the peripheral device controlling device 210. The fetched data may be stored in the intermediate buffer 214 of the peripheral device controlling device 210.

In operation S216, the peripheral device controlling device 210 may generate a second peripheral device command CMD_D2 to be executed second. The second peripheral device command CMD_D2 may be a command that causes the network device to fetch data stored in the intermediate buffer 214 and to transfer the fetched data to the outside of the server system 100. The second peripheral device command CMD_D2 may include TCP/IP information for transferring data to the outside. The peripheral device controlling device 210 may generate the second peripheral device command CMD_D2 according to the standard protocol required by the network device.

In operation S217, the peripheral device controlling device 210 may transmit the generated second peripheral device command CMD_D2 to the network device. In operation S218, the network device may fetch data stored in the peripheral device controlling device 210. In an exemplary embodiment, the network device may fetch data stored in the source address of the second D2D command CMD2 (e.g., the memory address of the intermediate buffer 214). In operation S219, the network device may generate a packet to be transmitted to the outside of the server system 100. In an exemplary embodiment, the generated packet may include information on the fetched data and TCP/IP. In operation S21*a*, the network device may transmit the generated packet to the outside of the server system 100.

When the operations in operations S211 to S21*a* are performed, data stored in the storage device may be transmitted to the network device and transmitted outside the server system 100. Therefore, even if there is a peripheral device that may not access memory, the peripheral device controlling device 210 according to an embodiment of the inventive concept may perform the D2D between the first and second peripheral devices 101 and 102.

Figure 11:
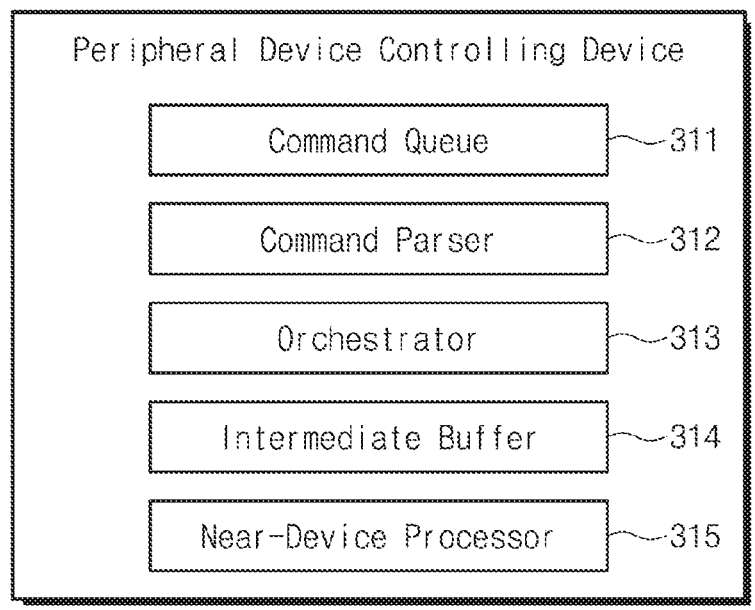
FIG. 11 is a block diagram illustrating one embodiment of the peripheral device controlling device of FIG. 1.

FIG. 11 is a block diagram illustrating one embodiment of the peripheral device controlling device of FIG. 1. Referring to FIG. 11, the peripheral device controlling device 310 may include a command queue 311, a command parser 312, an orchestrator 313, an intermediate buffer 314, and a near-device processor 315. The command queue 311, the command parser 312, the orchestrator 313, and the intermediate buffer 314 are similar to the command queue 211, the command parser 212, the orchestrator 213, and the intermediate buffer 214 of FIG. 9. Therefore, redundant detailed description is omitted.

When D2D and intermediate data processing are required, the data to be processed may be stored in the intermediate buffer 314.

The near-device processor 315 may process the data stored in the intermediate buffer 314. In an exemplary embodiment, a D2D command requesting intermediate data processing may be delivered via command queue 311. The command parser 312 may interpret the D2D command and transfer the information necessary for the intermediate data processing to the orchestrator 313. For example, the command parser 312 interprets the fifth D2D command CMD5 of FIG. 4 and delivers information on the type of data processing, the source address and destination address of the intermediate buffer, data length, dependencies, and the like to the orchestrator 313. The orchestrator 313 may control the near-device processor 315 based on the transmitted information.

In an exemplary embodiment, the orchestrator 313 may determine the order of execution of intermediate data processing based on dependencies. When the order of performing the intermediate data processing is reached, the orchestrator 313 may process the intermediate data through the near-device processor 315. The near-device processor 315 may fetch data from the source address of the D2D command and perform operations according to the data processing type. For example, the near-device processor 315 may perform operations such as "MD5 hash", "CRC32 checksum", and the like on the fetched data.

The near-device processor 315 processes the data and stores the calculated result data in the destination address of the D2D command. In this case, the source address and the destination address may be the memory address of the intermediate buffer 314. Alternatively, if the memory of the peripheral device is accessible by the peripheral device controlling device 310, the source address and the destination address may be memory addresses of the peripheral device.

Figure 12:
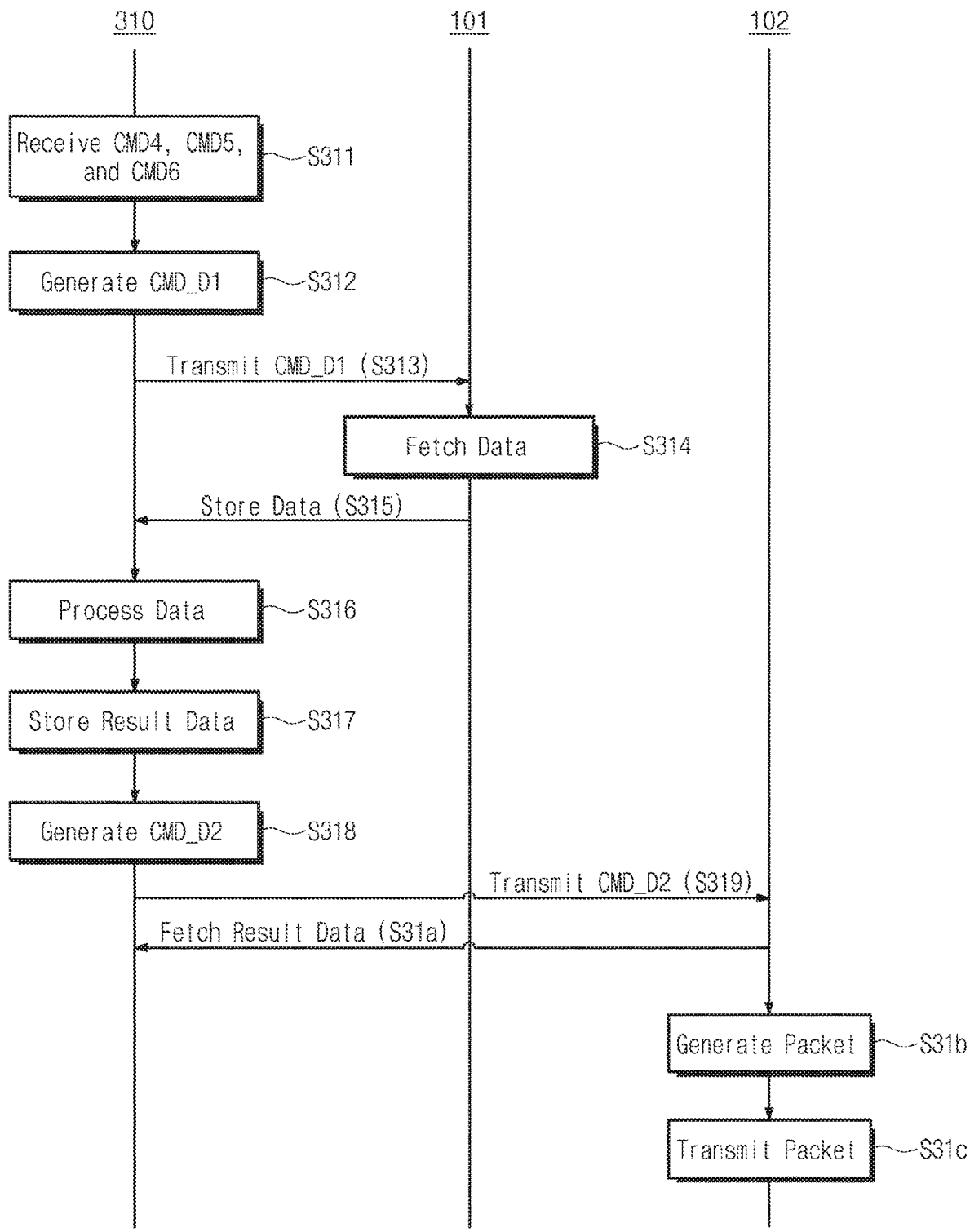
FIG. 12 is a flowchart showing an example according to an operation of the peripheral device controlling device of FIG. 11.

FIG. 12 is a flowchart showing an example according to an operation of the peripheral device controlling device of FIG. 11. FIG. 12 shows an example of D2D and intermediate data processing between the first and second peripheral devices 101 and 102. Hereinafter, for ease of explanation, it is assumed that the first peripheral device 101 is a storage device and the second peripheral device 102 is a network device.

Referring to FIGS. 1, 11, and 12, in operation S311, the peripheral device controlling device 310 may receive the fourth to sixth D2D commands CMD4 to CMD6. In this case, the fifth D2D command CMD5 may include a value corresponding to the data processing type for the intermediate data processing. For example, the fourth to sixth D2D commands CMD4 to CMD6 may be the fourth to sixth D2D commands CMD4 to CMD6 of FIG. 4.

In operation S312, the peripheral device controlling device 310 may first generate the first peripheral device command CMD_D1 corresponding to the fourth D2D command CMD4 based on the dependency of the fourth to sixth D2D commands CMD4 to CMD6. The first peripheral device command CMD_D1 may be a command for causing the storage device to fetch the stored data and to store the fetched data in the peripheral device controlling device 310. The peripheral device controlling device 310 may generate the first peripheral device command CMD_D1 according to the standard protocol required by the storage device.

In operation S313, the peripheral device controlling device 310 may transmit the first peripheral device command CMD_D1 to the storage device. In operation S314, the storage device may fetch data in response to the first peripheral device command CMD_D1. In operation S315, the storage device may store the fetched data in the peripheral device controlling device 310. In this case, the storage device may store the fetched data in the intermediate buffer 314 of the peripheral device controlling device 310. The peripheral device controlling device 310 may confirm from the storage device that the operation for the first peripheral device command CMD_D1 is normally performed.

After the operation on the first peripheral device command CMD_D1 is completed, the peripheral device controlling device 310 may perform an operation for the fifth D2D command CMD5 according to a value corresponding to the dependency. In an exemplary embodiment, the operation corresponding to the fifth D2D command CMD5 is intermediate data processing, so the peripheral device controlling device 310 may not generate a separate peripheral device command.

In operation S316, the peripheral device controlling device 310 may process the data based on the fifth D2D command CMD5. In an exemplary embodiment, the peripheral device controlling device 310 may process data stored in the intermediate buffer 314 via the near-device processor 315. In operation S317, the peripheral device controlling device 310 may process the data and store the calculated result data. In an exemplary embodiment, the peripheral device controlling device 310 may store the result data in the destination address of the fifth D2D command CMD5. In this case, the destination address may be the memory address of the intermediate buffer 314.

After the intermediate data processing is completed, in operation S318, the peripheral device controlling device 310 generates the second peripheral device command CMD_D2 for the sixth D2D command CMD6 according to the value corresponding to the dependency. The second peripheral device command CMD_D2 may be a command that causes the network device to fetch data stored in the peripheral device controlling device 310 and to transfer the fetched data to the outside of the server system 100. In operation S319, the peripheral device controlling device 310 may transmit the second peripheral device command CMD_D2 to the network device.

In operation S31a, the network device may fetch the result data in response to the second peripheral device command CMD_D2. In an exemplary embodiment, the network device may access the memory address of the intermediate buffer 314 where the result data is stored and fetch the result data. In operation S31b, the network device may generate the packet to transmit the result data to the outside. In an exemplary embodiment, the second peripheral device command CMD_D2 may include information of TCP/IP. The network device may generate a packet including the result data and information of TCP/IP. In operation S31c, the network device may transmit the generated packet to the outside of the server system 100.

As described above, when the operations of steps S311 to S31c are performed, the data of the storage device may be transmitted to the network device through the data processing process. In addition, the transmitted data may be transmitted outside the server system 100. The peripheral device controlling device 310 according to an embodiment of the inventive concept may perform processing of D2D and intermediate data between the first and second peripheral devices 101 and 102.

Figure 13:
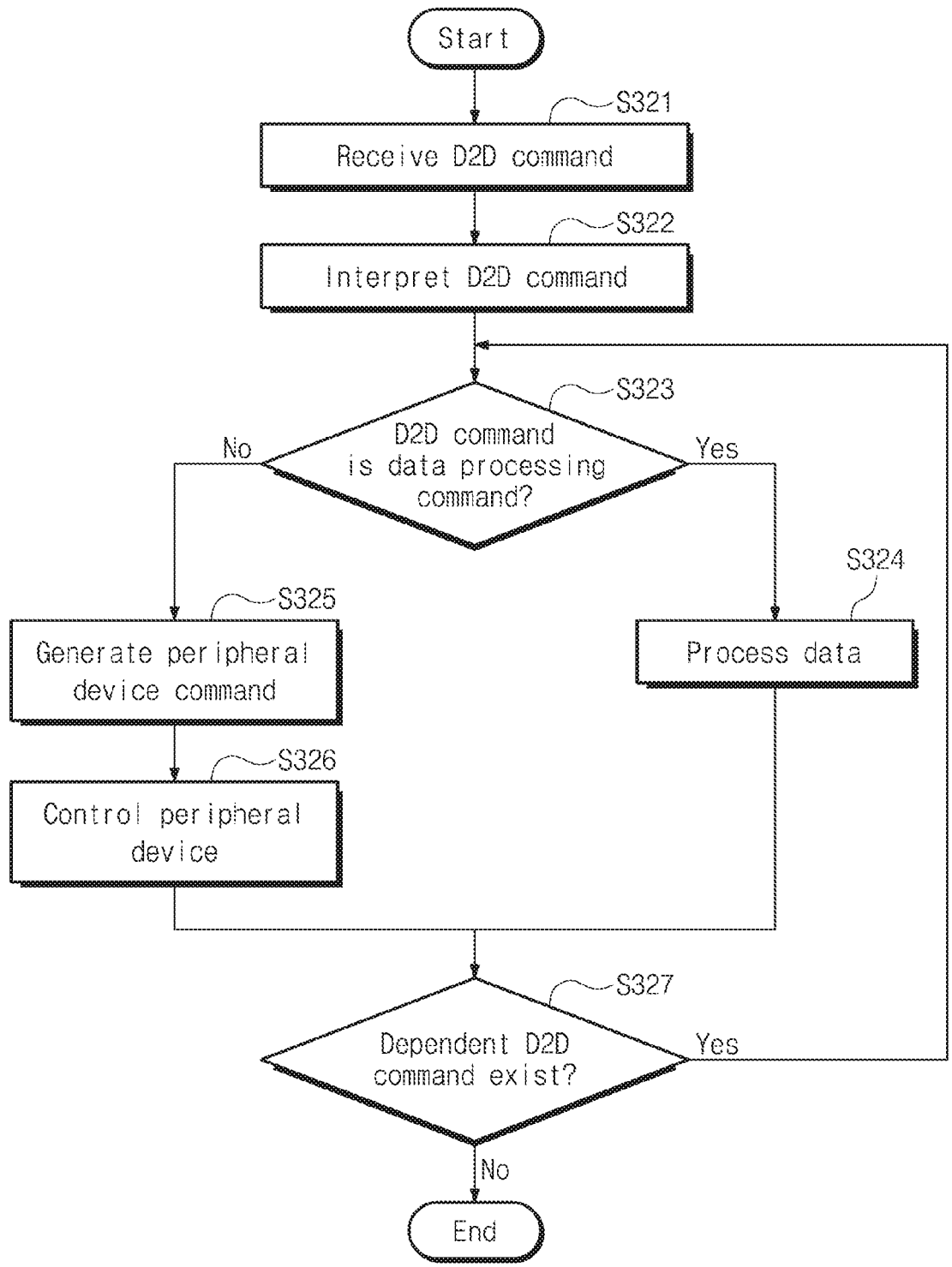
FIG. 13 is a flowchart showing an operation of the peripheral device controlling device of FIG. 11.

FIG. 13 is a flowchart showing an operation of the peripheral device controlling device of FIG. 11. Referring to FIGS. 11 and 13, the peripheral device controlling device 310 may perform operations in operations S321 and S322. The operations in operations S321 and S322 are similar to those in operations S131 and S132 in FIG. 8, and therefore, detailed description thereof will be omitted.

In operation S323, the peripheral device controlling device 310 may determine whether the D2D command to be processed is a data processing command. In an exemplary embodiment, the peripheral device controlling device 310 may determine whether the D2D command to be processed is a data processing command based on whether the D2D command to be processed includes a value corresponding to the data processing type. When the D2D command includes a value corresponding to the target device, the peripheral device controlling device 310 may determine that the D2D command is not a data processing command. When the D2D command includes a value corresponding to the data processing type, the peripheral device controlling device 310 may determine that the D2D command is a data processing command.

If it is determined that the D2D command is a data processing command, the peripheral device controlling device 310 may process the data based on the D2D command in operation S324. The peripheral device controlling device 310 may fetch data from the source address of the D2D command and process the data by performing an operation corresponding to the data processing type. The peripheral device controlling device 310 may store the processed result data in the destination address of the D2D command. The source address and the destination address may be the memory addresses of the peripheral device controlling device 310. Alternatively, the source address and the destination address may be the memory addresses of the peripheral devices accessible to the memory.

If the D2D command is not a data processing command, the peripheral device controlling device 310 may perform operations in operations S325 and S326. The operations in operations S325 and S326 are similar to those in operations S133 and S134 in FIG. 8, and therefore, detailed description thereof will be omitted.

When the data processing operation or the peripheral device control operation is completed, in operation S327, the peripheral device controlling device 310 may determine whether or not a dependent D2D command exists. In an exemplary embodiment, the peripheral device controlling device 310 may determine whether there is a dependent D2D command based on the dependencies of the D2D commands. If there is a dependency D2D command, the peripheral device controlling device 310 may perform the operation in operation S323. If there is no dependent D2D command, the peripheral device controlling device 310 may terminate the operation.

A peripheral device controlling device according to embodiments of the inventive concept may not use host resources in a D2D process between peripheral devices. In addition, the peripheral device controlling device may process data without using host resources during intermediate data processing. If host resources are not used, access to the CPU or memory of the host may be skipped and the data communication path between the peripheral devices may be shortened. Accordingly, the peripheral device controlling device may improve the data communication speed between the peripheral devices and minimize the use of host resources.

A peripheral device controlling device according to embodiments of the inventive concept may exist as a separate device from the peripheral devices. Thus, the peripheral device controlling device may control the peripheral devices without changing the hardware configuration of the peripheral devices.

A peripheral device controlling device according to embodiments of the inventive concept may be implemented in hardware, software, or a combination thereof. In an exemplary embodiment, when the peripheral device controlling device is implemented in hardware, the peripheral device controlling device may be implemented in a form mounted on the server system. For example, when a peripheral device controlling device operates based on a PCIe standard interface, the peripheral device controlling device may be implemented as a PCIe card and mounted in a PCIe slot. Therefore, the peripheral device controlling device according to the inventive concept may be implemented based on various interfaces.

Elements included in a peripheral device controlling device according to embodiments of the inventive concept can be implemented in a form of software, hardware, or a combination thereof. For example, the software can be machine code, firmware, embedded code, and application software. Also for example, the hardware can be electrical circuitry, electronic circuitry, processor, computer, integrated circuit, integrated circuit cores, a pressure sensor, an inertial sensor, a microelectromechanical system (MEMS), passive devices, or a combination thereof.

The peripheral device controlling device driver according to an embodiment of the inventive concept may be software connecting the peripheral device controlling device and the host. In response to a command from the host, the peripheral device controlling device driver may generate a D2D command according to predetermined rules or promises and deliver the generated D2D command to the peripheral device controlling device. Accordingly, the peripheral device controlling device may efficiently perform the D2D and the intermediate data processing operation corresponding to the command of the host.

According to an embodiment of the inventive concept, provided are a peripheral device controlling device capable of shortening the time for data communication between peripheral devices and minimizing the use of a host CPU or memory resource, an operation method thereof, and an operation method of a peripheral device controlling device driver.

Although the exemplary embodiments of the inventive concept have been described, it is understood that the inventive concept should not be limited to these exemplary embodiments but various changes and modifications can be made by one ordinary skilled in the art within the spirit and scope of the inventive concept as hereinafter claimed.

What is claimed is:

1. A peripheral device controlling device of a server system including a first peripheral device, a second peripheral device, the peripheral device controlling device, a central processing unit, and a memory, the peripheral device controlling device comprising:
   a command queue configured to store a Device to Device (D2D) command for data communication from the first peripheral device to the second peripheral device, the D2D command generated by a device driver under control of the central processing unit;

a command parser configured to parse the D2D command and obtain information related to the data communication from the D2D command; and an orchestrator configured to generate a peripheral device command based on the information and transmit the peripheral device command to the first peripheral device, the first peripheral device fetching data and transmitting the fetched data to the second peripheral device in response to the peripheral device command.

2. The peripheral device controlling device of claim 1, wherein the D2D command generated by the device driver includes information on a target device, a source address, and a destination address associated with the data communication, the target device indicates the first peripheral device, the source address indicates a memory address of the first peripheral device, and the destination address indicates a memory address of the second peripheral device.

3. The peripheral device controlling device of claim 2, wherein the orchestrator controls the target device to fetch the data stored in the source address based on the D2D command and controls the target device to store the fetched data in the destination address.

4. The peripheral device controlling device of claim 2, wherein the D2D command further includes information on a communication direction and a data length associated with the data communication, wherein the communication direction indicates whether the data is written to the target device or read from the target device, and the data length indicates a length of data stored in the source address.

5. The peripheral device controlling device of claim 2, wherein the D2D command further includes information on dependency associated with the data communication, wherein the dependency indicates whether there is a dependent D2D command to be additionally performed after the at least one D2D command is performed, wherein the orchestrator determines that the dependent D2D command does not exist based on the dependency.

6. The peripheral device controlling device of claim 1, wherein the orchestrator generates the peripheral device command in accordance with a standard device protocol requested by the first peripheral device.

7. The peripheral device controlling device of claim 1, further comprising, when the data stored in the first peripheral device is fetched, an intermediate buffer for storing the fetched data.

8. The peripheral device controlling device of claim 7, wherein the D2D command is a first D2D command and the command queue further stores a second D2D command, and each of the first D2D command and the second D2D command includes information on a target device, a source address, a destination address, and a dependency related to the data communication, wherein the target device of the first D2D command indicates the first peripheral device, the source address of the first D2D command indicates a memory address of the first peripheral device, the destination address of the first D2D command indicates a memory address of the intermediate buffer, and the dependency of the first D2D command indicates that the dependent second D2D command exists, and wherein the target device of the second D2D command indicates the second peripheral device, the source address of the second D2D command indicates the memory address of the intermediate buffer, the destination address of the second D2D command indicates a memory address of the second peripheral device, and the dependency of the second D2D command indicates that the dependent D2D command does not exist.

9. The peripheral device controlling device of claim 8, wherein the orchestrator controls the first peripheral device to fetch the data stored in the memory address of the first peripheral device based on the first D2D command and to store the fetched data in the memory address of the intermediate buffer, and controls the second peripheral device to fetch data stored in the memory address of the intermediate buffer based on the second D2D command and to store the fetched data in the memory address of the second peripheral device.

10. The peripheral device controlling device of claim 8, wherein the orchestrator performs the first D2D command based on the dependency of the first D2D command and the dependency of the second D2D command and then performs the second D2D command.

11. The peripheral device controlling device of claim 8, wherein one of the first D2D command and the second D2D command further comprises information of Transmission Control Protocol/Internet Protocol (TCP/IP), wherein the orchestrator controls the second peripheral device to fetch data stored in the memory address of the intermediate buffer based on the second D2D command, and controls the second peripheral device to generate a packet including the fetched data and the information of the TCP/IP and to transmit the generated packet to the outside.

12. The peripheral device controlling device of claim 7, further comprising a near-device processor configured to process the fetched data stored in the intermediate buffer to generate result data, and store the result data in the intermediate buffer.

13. The peripheral device controlling device of claim 12, wherein the D2D command is a first D2D command and the command queue further stores a second D2D command and a third D2D command, each of the first D2D command and the third D2D command includes information on a target device, a source address, a destination address, and a dependency associated with the data communication, and the second D2D command includes information on a data processing type, a source address, a destination address, and a dependency related to the processing, wherein the target device of the first D2D command indicates the first peripheral device, the source address of the first D2D command indicates a memory address of the first peripheral device, the destination address of the first D2D command indicates a first memory address of the intermediate buffer, and the dependency of the first D2D command indicates that a dependent second D2D command exists, wherein the data processing type of the second D2D command indicates a kind of operation corresponding to the processing, the source address of the second D2D command indicates the first memory address of the intermediate buffer, the destination address of the second D2D command indicates a second memory address of the intermediate buffer, and the dependency of the second D2D command indicates that a dependent third D2D command exists, and wherein the target device of the third D2D command indicates the second peripheral device, the source address of the third D2D command indicates the second memory address of the intermediate buffer, the destination address of the third D2D command indicates a memory address of the second peripheral device, and the dependency of the third D2D command indicates that a dependent D2D command does not exist.

14. The peripheral device controlling device of claim 13, wherein
the orchestrator controls the first peripheral device to fetch the data stored in the memory address of the first peripheral device based on the first D2D command and controls the first peripheral device to store the fetched data in the first memory address of the intermediate buffer,
controls the near-device processor to process data stored in the first memory address of the intermediate buffer according to the data processing type based on the second D2D command and then, controls the near-device processor to store the result data in the second memory address of the intermediate buffer, and
controls the second peripheral device to fetch data stored in the second memory address of the intermediate buffer based on the third D2D command and controls the second peripheral device to store the fetched data in the memory address of the second peripheral device.

15. The peripheral device controlling device of claim 1, wherein each of the first peripheral device, the second peripheral device, and the peripheral device controlling device is mounted in a Peripheral Component Interconnect Express (PCIe) slot.

16. An operation method of a peripheral device controlling device of a server system including of a first peripheral device, a second peripheral device, the peripheral device controlling device, a central processing unit, and a memory, the method comprising:
receiving, by a command queue of the peripheral device controlling device, at least one D2D command for transmission of data between the first peripheral device and the second peripheral device, the at least one D2D command generated by a device driver under control of the central processing unit;
obtaining, by a command parser of the peripheral device controlling device, information related to the transmission of the data from the at least one D2D command;
generating, by an orchestrator of the peripheral device controlling device, a peripheral device command based on the obtained information; and
transmitting, by the orchestrator of the peripheral device controlling device, the peripheral device command to the first peripheral device the first peripheral device fetching data and transmitting the fetched data to the second peripheral device in response to the peripheral device command.

17. The method of claim 16, further comprising:
determining whether the at least one D2D command includes a data processing command based on the obtained information; and
processing, by a near-device processor of the peripheral device controlling device, the data if the data processing command exists.

18. An operation method of a peripheral device controlling device driver of a peripheral device controlling device of a server system including a first peripheral device, a second peripheral device, the peripheral device controlling device, and a host, the method comprising:
receiving, by the peripheral device controlling device driver, from the host a command for transferring data from the first peripheral device to the second peripheral device;
checking, by the peripheral device controlling device driver, driving information of the first peripheral device and the second peripheral device from the host;
generating, by the peripheral device controlling device driver, at least one D2D command for the command based on the driving information; and
transferring, by the peripheral device controlling device driver, the at least one D2D command to the peripheral device controlling device.

19. The method of claim 18, wherein the at least one D2D command includes information on a target device, a source address, and a destination address associated with the transferring data,
the target device indicates the first peripheral device,
the source address indicates a memory address of the first peripheral device, and
the destination address indicates a memory address of the second peripheral device.

* * * * *